(12) United States Patent
Finger

(10) Patent No.: US 12,408,033 B2
(45) Date of Patent: *Sep. 2, 2025

(54) DEVICE AUTHENTICATION IN A WIRELESS TELECOMMUNICATIONS NETWORK

(71) Applicant: T-Mobile USA, Inc., Bellevue, WA (US)

(72) Inventor: Joshua Finger, Covington, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,658

(22) Filed: Jun. 12, 2024

(65) Prior Publication Data

US 2024/0334189 A1 Oct. 3, 2024

Related U.S. Application Data

(63) Continuation of application No. 17/525,626, filed on Nov. 12, 2021, now Pat. No. 12,041,445, which is a continuation of application No. 16/927,814, filed on Jul. 13, 2020, now Pat. No. 11,206,535.

(51) Int. Cl.
| | |
|---|---|
| *H04W 12/06* | (2021.01) |
| *H04L 65/1073* | (2022.01) |
| *H04L 67/06* | (2022.01) |
| *H04W 8/04* | (2009.01) |
| *H04W 8/18* | (2009.01) |
| *H04W 48/18* | (2009.01) |
| *H04W 60/02* | (2009.01) |

(52) U.S. Cl.
CPC ........ *H04W 12/06* (2013.01); *H04L 65/1073* (2013.01); *H04L 67/06* (2013.01); *H04W 8/04* (2013.01); *H04W 8/18* (2013.01); *H04W 48/18* (2013.01); *H04W 60/02* (2013.01)

(58) Field of Classification Search
CPC .................................................. H04W 12/06
USPC ....................................................... 455/411
See application file for complete search history.

(56) References Cited

U.S. PATENT DOCUMENTS

| | | |
|---|---|---|
| 6,714,799 B1 | 3/2004 | Park et al. |
| 6,961,567 B1 | 11/2005 | Kuhn |
| 7,730,127 B2 | 6/2010 | Ke |
| 7,738,868 B2 | 6/2010 | Bajar et al. |
| 8,238,267 B2 | 8/2012 | Dwyer et al. |
| 8,260,290 B2 | 9/2012 | Pressley et al. |
| 8,676,195 B2 | 3/2014 | Zhang et al. |
| 9,253,747 B1 | 2/2016 | Saleh et al. |
| 10,009,799 B2 | 6/2018 | Hu |
| 11,206,535 B1 * | 12/2021 | Finger .................. H04W 48/18 |

(Continued)

FOREIGN PATENT DOCUMENTS

| | | |
|---|---|---|
| KR | 20030056944 A | 7/2003 |
| KR | 100398991 B1 | 9/2003 |

*Primary Examiner* — Qutbuddin Ghulamali
(74) *Attorney, Agent, or Firm* — Perkins Coie LLP

(57) ABSTRACT

Systems and methods for authenticating User Equipment (UE) are disclosed. The method includes a network obtaining a cross-registration status for the UE based on receiving a registration request from the UE. The network can execute a network registration response according to the cross-registration status that represents a permission given to the UE to register outside of an original network.

20 Claims, 4 Drawing Sheets

(56) References Cited

U.S. PATENT DOCUMENTS

| | | | |
|---|---|---|---|
| 2004/0082321 A1 | 4/2004 | Kontianinen | |
| 2006/0174009 A1 | 8/2006 | Martiquet et al. | |
| 2006/0218291 A1 | 9/2006 | Zhu et al. | |
| 2007/0022469 A1* | 1/2007 | Cooper | H04L 9/3247 |
| | | | 726/3 |
| 2007/0060042 A1 | 3/2007 | Ko | |
| 2008/0076412 A1 | 3/2008 | Khetawat et al. | |
| 2008/0151912 A1 | 6/2008 | Joong et al. | |
| 2008/0186921 A1 | 8/2008 | Long et al. | |
| 2008/0250466 A1 | 10/2008 | Ke | |
| 2009/0262683 A1 | 10/2009 | Khetawat et al. | |
| 2009/0270098 A1 | 10/2009 | Gallagher et al. | |
| 2010/0040024 A1 | 2/2010 | Wu | |
| 2010/0085937 A1 | 4/2010 | Pressley et al. | |
| 2010/0150336 A1* | 6/2010 | Chen | H04M 3/42272 |
| | | | 379/265.02 |
| 2010/0202450 A1* | 8/2010 | Ansari | H04L 63/08 |
| | | | 370/389 |
| 2010/0226347 A1 | 9/2010 | Caldwell et al. | |
| 2010/0244971 A1* | 9/2010 | Wang | G04F 10/005 |
| | | | 331/1 A |
| 2010/0248720 A1* | 9/2010 | Millet | H04W 12/069 |
| | | | 455/435.1 |
| 2011/0009113 A1 | 1/2011 | Vikberg et al. | |
| 2012/0014354 A1 | 1/2012 | Dwyer et al. | |
| 2012/0117624 A1* | 5/2012 | Khan | H04L 65/1076 |
| | | | 726/3 |
| 2015/0327073 A1 | 11/2015 | Rommer et al. | |
| 2016/0227447 A1 | 8/2016 | Hu | |
| 2018/0352528 A1 | 12/2018 | Kunz et al. | |
| 2018/0376445 A1 | 12/2018 | Yoon et al. | |
| 2019/0007921 A1 | 1/2019 | Schliwa-Bertling et al. | |
| 2019/0053308 A1 | 2/2019 | Castellanos Zamora et al. | |
| 2019/0387407 A1 | 12/2019 | Jost et al. | |
| 2020/0053545 A1* | 2/2020 | Wong | H04W 76/27 |
| 2022/0078613 A1* | 3/2022 | Finger | H04W 8/04 |

\* cited by examiner

DEVICE AUTHENTICATION IN A WIRELESS TELECOMMUNICATIONS NETWORK

CROSS-REFERENCE TO RELATED APPLICATION

This application is a continuation of U.S. patent application Ser. No. 17/525,626, filed Nov. 12, 2021, entitled "DEVICE AUTHENTICATION IN A WIRELESS TELECOMMUNICATIONS NETWORK," which is a continuation of U.S. patent application Ser. No. 16/927,814 (now issued as U.S. Pat. No. 11,206,535), filed Jul. 13, 2020, entitled "DEVICE AUTHENTICATION IN A WIRELESS TELECOMMUNICATIONS NETWORK," which is hereby incorporated by reference in its entirety.

BACKGROUND

Rapid growth in computing technology is creating greater demand for data communication. For example, the number of communicating devices are rapidly increasing due to technological advances in mobile computing, Internet of Things (IoT), wearable devices, and other such electronic devices. Such technological advances are also driving development of new software/mobile applications that introduce new ways to share, utilize, and consume communicated data. Unfortunately, the number of nefarious or unauthorized attempts to capitalize on the technological advancements is also increasing rapidly.

Figure 1:
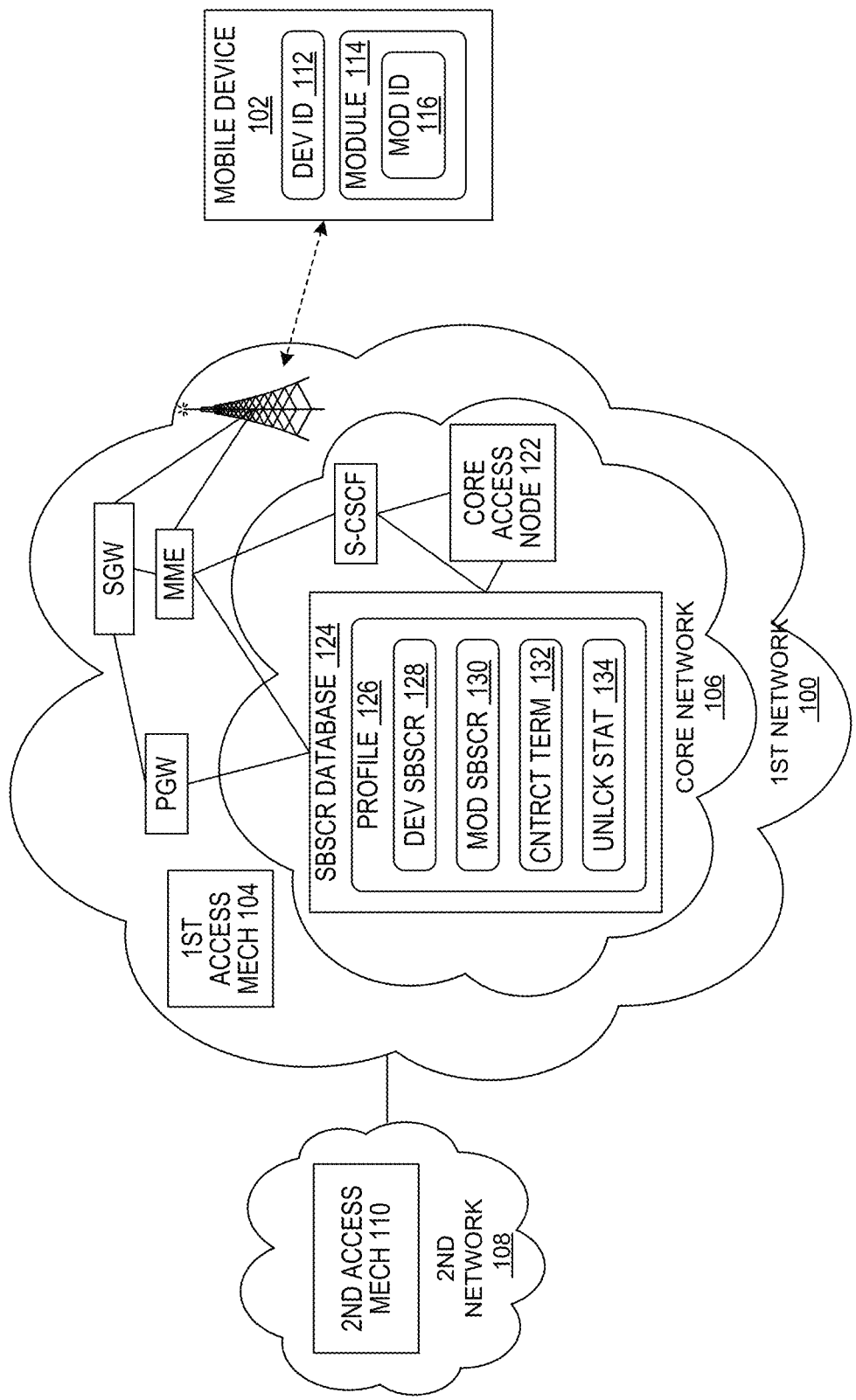
FIG. 1 illustrates a communication network in which some implementations of the present technology can be utilized.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

A mobile communication network (e.g., a cellular communication network) can facilitate data transfers between end-user devices, such as between a mobile personal device (e.g., a User Equipment (UE)) and a service provider device (e.g., a server). The mobile communication network (the "network") can transfer data to and from the end-user devices according to one or more channel access methods/mechanisms. For example, a telecommunication service provider (e.g., a carrier) may operate a Global System for Mobile Communications (GSM) network and/or a Code-Division Multiple Access (CDMA) type network.

The different types of networks can implement different registration mechanisms or protocols. For example, the UEs may be required to use device-based identifiers to register with and utilize the CDMA type networks. In other words, a hardware device (e.g., the UE, such as a smart phone) may be contractually subscribed to a CDMA network. Also, a UE configured to access the GSM type network may be configured to accept a transportable access module (e.g., a Subscriber Identity Module (SIM) card). The UE may register with and utilize the GSM type network based on a unique identifier associated with the access module. Accordingly, the subscription may be contractually associated with the access module while being agnostic as to the hardware device facilitated by the access module. In other words, the user may access the GSM network using different devices (i.e., at different times) as long as the user inserts the authorized SIM card into the different devices.

Despite the different registration mechanisms, mobile devices are often configured with the capacity to operate on multiple different types of networks. In some aspects, the UE manufacturers configure the devices with the increased capacity to increase the number of potential customers while maintaining uniform design. Also, some higher-bandwidth communication protocols (e.g., Long-Term Evolution (LTE) or Fifth Generation (5G) Radio standards) are requiring the use of access modules. Accordingly, when a network provider deploys the higher-bandwidth network in addition to an existing CDMA network, a subscriber UE is required to use the access module to utilize the new network. In some instances, a network provider can simultaneously operate different types of networks (e.g., both a GSM network and a CDMA network), such as due to mergers or purchases.

The enhanced operability can provide increased flexibilities for a network provider and the user. For example, a user may use the same device to subscribe to different network providers once a previous contractual obligation has been met. In other words, once a mobile device is unlocked, a user may use the unlocked device to subscribe to and utilize a network without being limited by the channel access technology of the network. Also, for example, a carrier that provides multiple types of networks may provide and implement different access plans by leveraging the different registration mechanisms.

Unfortunately, the enhanced operability can also introduce new ways to nefariously access network services. As an illustrative example, a carrier can provide both a CDMA network and a GSM network. The carrier can provide different subscription plans (based on, e.g., available maximum bandwidths, prepaid device plans, refurbished device plans, etc.) for the CDMA network and/or the GSM network. For such networks, a nefarious usage scenario may include a prepaid or a liquidated (e.g., refurbished) CDMA device (i.e., subscribed to a limited/lower-level access to the CDMA network) being used to access a premium service (e.g., LTE or 5G network associated with the GSM network) via a corresponding SIM card. In other words, a nefarious user may attempt to bypass contractual obligations/limitations of the CDMA device using a SIM card associated with the GSM network.

Implementations of the present technology enables a network to authenticate and manage registration of devices across networks having different channel access methods and different registration mechanisms. For example, the network can manage registration of CDMA devices within a GSM environment (or vice versa). The network can be an integrated environment (e.g., an integrated network that includes both CDMA and GSM sub-networks) that allows for CDMA devices to operate in GSM network. In managing device registrations, the network can query an eligibility database for contractual status of the registering device (e.g., CDMA-based device). The network can register the requesting device and provide network access thereto when the database indicates eligibility status (e.g., having met requirements for unlocking the device). Otherwise, the network can deny registration and prevent the requesting device to access/utilize the network (e.g., a core network 106 therein). Accordingly, the network can block nefarious or unauthorized attempts to gain access thereto by using unlocked secondary registration mechanism (e.g., an access module, such as a SIM card) to override or hide locked status associated with a primary registration mechanism (e.g., CDMA-based contractual obligation).

Along with denying the registration request, the network can temporarily blacklist the requesting device (i.e., instead of permanently blacklisting the device). The temporary status can expire relatively quickly (e.g., within minutes) to enable the device to re-register using a proper SIM. In other words, the network may enable the user to properly unlock the same device and register for the network based on the temporary/expiring blacklist status.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Suitable Environment

FIG. 1 illustrates a first communication first network 100 (also referred to herein as the first network 100) in accordance with various implementations or embodiments. The first network 100 can communicatively couple devices including a mobile device 102 (e.g., a User Equipment (UE)). Some examples of the mobile device 102 can include a mobile phone (e.g., a smart phone), a laptop, a transceiver in a vehicle, a wearable device (e.g., a smart watch, augmented-reality (AR) glasses, virtual-reality (VR) glasses, etc.), an IoT device, and the like.

The first network 100 may include access nodes configured to serve as hubs that function as gateways for the first network 100. Some examples of the access node can include a Radio Access Network (RAN) Node (e.g., an Evolved-Universal Terrestrial Radio Access Network (E-UTRAN) Node B (eNode B or eNB), a Radio Network Controller (RNCs) in an E-UTRAN, and/or a next generation Node B (gNB)). The access node may also include a base station, a Wireless Fidelity (WiFi) router, a modem, and/or other network gateway devices. The access nodes can be configured to communicate with the mobile device 102 according to one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication technologies. As an illustrative example, the first network 100 can operate according to a first access mechanism 104 (e.g., a channel access method/mechanism and/or a corresponding network structure or protocol).

In general, the first network 100 can include multiple cells, with each cell including one or more BSs (macro cell), 5G transceivers (including small cell devices), or a combination of both macro and small cells (HetNets), though many other cell types are possible including cells having one or more femtocells, picocells, IEEE 802.11 access points (WiFi APs), and the like. Depending on the configuration and size, the first network 100 can represent and serve various regional areas, for example, one or more rooms, one or more blocks, a city, a state, an entire nation, the whole world, etc.

The first network 100 can provide a wireless communicative connection between the access node and the mobile device 102 according to one or more wireless communication standards/protocols as described above. The first network 100 can include network nodes communicatively coupled to the access nodes and configured to process and/or route information to/from the mobile device 102 to counterpart communication endpoints (e.g., service providers, content/service servers, and/or other end-user devices). The access nodes can be communicatively coupled (for example, using a backhaul connection) to backhaul equipment, for example, an operation support subsystem (OSS) server, a radio network controller (RNC), etc. Some examples of the network nodes can include a mobility management entity (MME), a serving gateway (SGW), and/or a package data network (PDN) gateway (PGW). Additionally or alternatively, the network nodes can include Network Functions (NFs).

A grouping of the network nodes can form a core network 106 that is configured to function as a backbone portion of the first network 100. For example, the core network 106 can include components (e.g., a set of the network nodes) configured to implement wireless communications, such as cellular communication networks and/or wireless fidelity networks. The core network 106 can be connected to different parts of the first network 100, such as the Internet and/or telephone networks. Accordingly, the core network 106 can establish/facilitate communication sessions for exchanging data between communication endpoints (e.g., end-user devices and/or service provider servers). In some implementations, the core network 106 can include an IP Multimedia Core network Subsystem (IMS).

The first network 100 may be operated by a service/network provider. End users may sign up as subscribers of the provider and one or more networks thereof. A single provider may operate one or more networks. In some instances, the provider may operate multiple networks corresponding to multiple protocols or access technologies. For example, a single provider may operate a 3G network, a 4G network, a 5G network, a telephone network, an IP-based network, and/or other such networks. Accordingly, a subscribing UE may be able to access one or more of the operating networks, simultaneously and/or separately.

For the example illustrated in FIG. 1, the first network 100 can be coupled to a second network 108 that operates according to a second access mechanism 110 (e.g., a channel access method/mechanism and/or a corresponding network structure or protocol). The second access mechanism 110 can be different from the first access mechanism 104. For example, the first access mechanism 104 can correspond to the GSM standard or a related network structure, and the second access mechanism 110 can correspond to the CDMA standard or a related network structure. In some implementations, one service provider (e.g., one carrier) can implement or operate both the first network 100 and the second network 108. Alternatively, the first network 100 and the second network 108 can correspond to different carriers.

In some implementations, the subscribed user and/or the user's device (e.g., the mobile device 102) may be contractually limited in the ability to utilize the networks provided by the carrier. Accordingly, the subscribed user may be limited to utilize a subset of access mechanisms and/or networks instead of the full set supported by the carrier.

Authentication methods for the different networks can correspond to the implemented access mechanism. For example, the second access mechanism 110 (e.g., CDMA-based protocol) can tie the subscription directly to devices (e.g., the mobile device). Accordingly, authentication for the second network 108 can require a device-based identifier 112 (e.g., an International Mobile Equipment Identity (IMEI)) that is unique to the hardware of the mobile device 102 and not transferrable to different devices, even when the devices are commonly owned. In comparison, the first access mechanism 104 (e.g., GSM-based protocol) can associate the subscription to an access module 114 (e.g., a Subscriber Identity Module (SIM)) that corresponds to a unique module-based identifier 116 (e.g., an International Mobile Subscriber Identity (IMSI)). Accordingly, authentication for the first network 100 can require the module-based identifier 116. As such, a user may access the first network 100 using different devices (i.e., at different times) by transferring the module-based identifier 116 into the accessing device.

In registering to access a network, the mobile device 102 can interact with a core access node 122 (e.g., an instance of a network node/function, such as a Proxy-Call Session Control Function (P-CSCF) or a Session Border Controller (SBC)). The core access node 122 can include hardware (e.g., circuitry), software, and/or firmware configured to interact with the mobile device 102 through the wireless connection and function as a gateway to the core network 106. Accordingly, the core access node 122 can be configured to facilitate registration of the mobile device 102 for the core network 106, such as for providing/allowing access to the core network 106. For example, the core access node 122 can function as a Session Initiation Protocol (SIP) proxy. The core access node 122 can receive, process, and/or forward to other network nodes a registration request from the mobile device 102. The core access node 122 can further send a registration response to the mobile device 102.

As an illustrative example, the mobile device 102 can send the registration request to the core access node 122 via the wireless connection. The mobile device 102 can be configured to include module-based identifier 116 and/or the device-based identifier 112 in the registration request. Upon receiving the registration request, the core network 106 (at, e.g., the core access node 122 and/or other nodes, such as a Serving-CSCF, and/or other nodes/functions) can analyze the one or more identifiers. The core network 106 can compare the one or more identifiers to information associated with access, subscription, contractual conditions, etc.

In some implementations, one or more network nodes can communicate with a subscription database 124 (e.g., a Home Subscriber Server (HSS) and/or a financial eligibility service server) to authorize or verify the identification of the requesting device. In one or more implementations, the subscription database 124 can be separate from the HSS and/or track contractual lock or unlock status. The subscription database 124 can be a network node that maintains a subscription profile 126 representative of network subscribers and/or information related thereto. For example, the subscription profile 126 can be used to track a device subscription data 128, a module subscription data 130, and/or an unlocked status 134 corresponding to one or more contractual terms 132 associated with a subscriber. The device subscription data 128 can specify the device-based identifiers associated with subscriber accounts, and the module subscription data 130 can specify the module-based identifier 116 associated with a subscriber account. In other words, the device subscription data 128 can represent the device-based identifier 112 authorized to access the core network 106, and the module subscription data 130 can represent the module-based identifiers authorized to access the core network 106. The unlocked status 134 can represent whether the subscriber has met the contractual terms 132 (e.g., a contractual duration and/or payment of a required sum).

Operating Details

Figure 2:
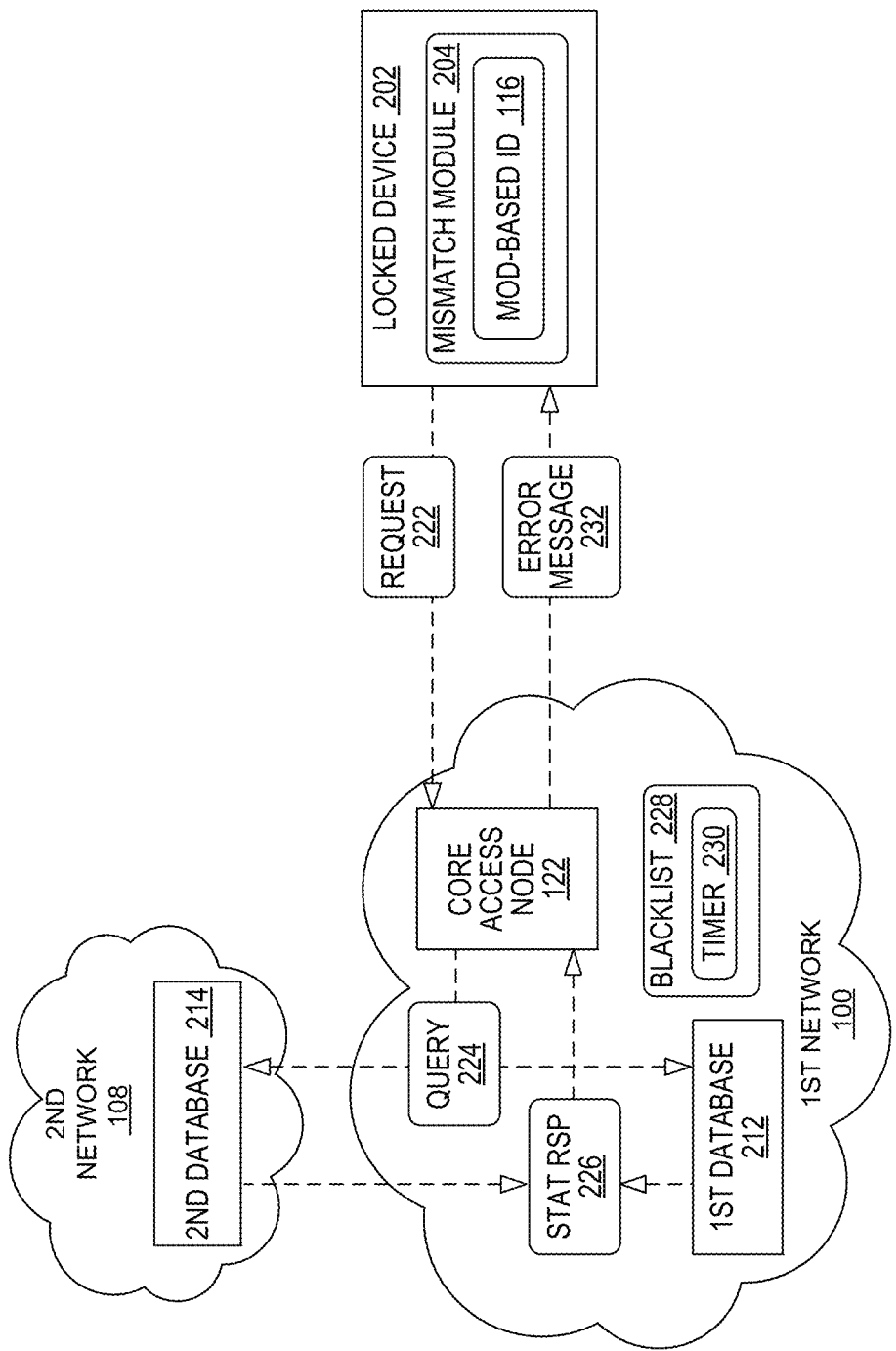
FIG. 2 illustrates example operating details in accordance with one or more implementations of the present technology.

FIG. 2 illustrates example operating details in accordance with one or more implementations of the present technology. FIG. 2 represents communications between a locked device 202 and the first network 100. The locked device 202 can be an instance of the mobile device 102 that is subject to contractual network access limitations. For example, the locked device 202 can be a CDMA-based device subject to contractually limited to accessing only the second network 108. As described above, the second network 108 can be within an integrated environment (e.g., operated by a common carrier) that also includes the first network 100.

Unfortunately, in providing enhanced accessibility across different networks that correspond to different access mechanisms, the network provider introduces new ways for users to gain unauthorized access to one or more of the networks. As an illustrative example, the carrier can provide different subscription plans (based on, e.g., available maximum bandwidths, prepaid device plans, refurbished device plans, etc.) for the first network 100 and/or the second network 108. A user nefariously or mistakenly may use an authorized identifier for one network to override access limitations associated with another network. For example, the locked device 202 can be subscribed to a limited/lower-level access to the second network 108. The locked device 202 may be used to attempt unauthorized access to the first network 100 (e.g., the GSM network and/or a premium network supported by the GSM network) by coupling the locked device 202 with a mismatching module 204 to access the first network 100. The locked device 202 can be a lower priced device, such as a prepaid device or a liquidated/refurbished device, having contractual limitations to access only the CDMA network or a portion thereof. The mismatching module 204 can include the access module 114 contractually independent of the locked device 202 and subscribed to access GSM network. In other words, a user may, nefariously or otherwise, attempt to bypass the contractual obligations/limitations of the locked device 202 using a SIM card associated with the GSM network.

As described in detail below, implementations of the present technology enable the carrier to authenticate and manage registration of devices across one or more of the supported networks. For example, the carrier can manage registration of CDMA devices within a GSM environment (or vice versa). In managing device registrations, the first network 100 can query the subscription database 124 (e.g., a first database 212 corresponding to the first network 100 and/or a second database 214 corresponding to the second network 108) for access-related status of the mobile device 102 (e.g., CDMA-based device). The first network 100 can register the mobile device 102 and provide network access thereto when the database indicates eligibility status (e.g., having met requirements for unlocking the device). Otherwise, the first network 100 can deny registration and prevent the requesting device to access/utilize thereto (e.g., a core network 106 therein).

As an illustrative example, the locked device 202 can send a registration request 222 to the first network 100 via a base station and a corresponding wireless connection. The registration request 222 can be sent in an attempt to gain access to the first network 100 or the core network 106 therein. The registration request 222 can be sent according to a Session Initiation Protocol (SIP). The locked device 202 can send the device-based identifier 112 and/or the module-based identifier 116 along with or within the registration request 222. The first network 100 can receive and begin processing the registration request 222 via the core access node 122 (e.g., P-CSCF).

The process the registration request 222, the first network 100 (via, e.g., the core access node 122 and/or another network node) can send a subscription status query 224 to one or more subscription databases 124. For example, the first network 100 can send the subscription status query 224 to the first database 212 (e.g., the HSS associated with the first network 100) and/or the second database 214 (e.g., the financial eligibility service server associated with the second network 108). When across different networks, such as when sent from the first network 100 to the second network 108, the subscription status query 224 can correspond to a cross-registration query for determining whether the requesting device is authorized to register with another network (e.g., the querying network). For example, the cross-registration query can inquire with the second network 108 whether the locked device 202 has met its contractual obligations (e.g., whether it is unlocked) to be able to register with the first network 100. The subscription status query 224 can include the device-based identifier 112 and/or the module-based identifier 116.

In response to receiving the subscription status query 224, the one or more subscription databases 124 can search the subscription profiles 126 thereof for the device-based identifier 112 and/or the module-based identifier 116. For example, the first database 212 can compare the device-based identifier 112 to the device subscription data 128 and/or compare the module-based identifier 116 to the module subscription data 130. The first network 100 can authorize the requesting device to access the core network 106 when the device-based identifier is listed in the device subscription data 128 and/or when the module-based identifier 116 is listed in the module subscription data 130. The first network 100 can deny registration of requesting device when the module-based identifier 116 is absent within the module subscription data 130. The first network 100 can communicate with the second network 108 when the comparisons generate inconsistent results.

For the example illustrated in FIG. 2, the module-based identifier 116 is listed in the module subscription data 130 since the mismatching module 204 is associated with the first network 100. However, the device-based identifier 112 of the locked device 202 is absent within the device subscription data 128 for the first network 100. Accordingly, the first network 100 can send the cross-registration query (e.g., a subsequent instance of the subscription status query 224) to the second network 108. Like the first database 212, the second database 214 of the second network 108 can compare the device-based identifier 112 to the device subscription data 128 and/or compare the module-based identifier 116 to the module subscription data 130 in response to receiving the cross-registration query. As described above, the device-based identifier 112 may be listed in the device subscription data 128 of the second network 108. However, the unlocked status 134 of the locked device 202 represents that the device has not met the contractual term 132. The second network 108 can generate a subscription status response 226 (e.g., a cross-registration status) in response the cross-registration query. The subscription status response 226 can include the unlocked status 134. For the locked device 202, the unlocked status 134 in the subscription status response 226 can indicate a locked status according to the conditions/context described above.

The first network 100 can receive the subscription status response 226 from the second network 108. When the subscription status response 226 indicates that the requesting device is an unlocked device (e.g., the device user has satisfied the contractual terms 132), the first network 100 can facilitate the device to access the first network 100. Otherwise, when the subscription status response 226 indicates that the requesting device is a locked device (e.g., the device user has not satisfied the contractual terms 132), the first network 100 can determine that the requesting device as the locked device 202. Accordingly, the first network 100 can block the locked device 202 from accessing the first network 100.

Additionally or alternatively, the first network 100 can update a network blacklist 228 to include the device-based identifier 112 and/or the module-based identifier 116 along with denying network access. In some implementation, the first network 100 can set/initiate a blackout timer 230 for the added identifier(s). The blackout timer 230 can include a circuit or a software function that measures a duration (e.g., a counter) for blacklisting the added addresses. In other words, the first network 100 can temporarily blacklist the locked device 202 using the blackout timer 230. The first network 100 can remove the added identifier(s) from the network blacklist 228 when the blackout timer 230 indicates that a predetermined duration has passed.

In some implementations, the first network 100 can further send a registration error message 232. The registration error message 232 can include a message for the user of the locked device 202 that indicates the locked status of the device and/or human-readable content indicating the basis for denying registration. For example, the registration error message 232 can include a Short Message Service (SMS) message, an email, a popup, or other audio-visual message.

The first network 100 can use the blackout timer 230 and/or the registration error message 232 to avoid permanently blacklisting the device in error. The registration request 222 may have been sent in error (e.g., without finishing a subscriber account initiation or a subscription update or an incorrect SIM accidentally inserted) and/or the locked status may have been determined due to an internal error. Accordingly, the blackout timer 230 allows the user and/or the locked device 202 to register with the first network 100 at a later time, such as after addressing any errors or contractual obligations of the user. Moreover, the registration error message 232 can notify the user of the denial and/or the cause so that the user may know to address any errors or contractual obligations (e.g. insert the proper SIM if an incorrect one was inadvertently inserted).

Control Flow

Figure 3:
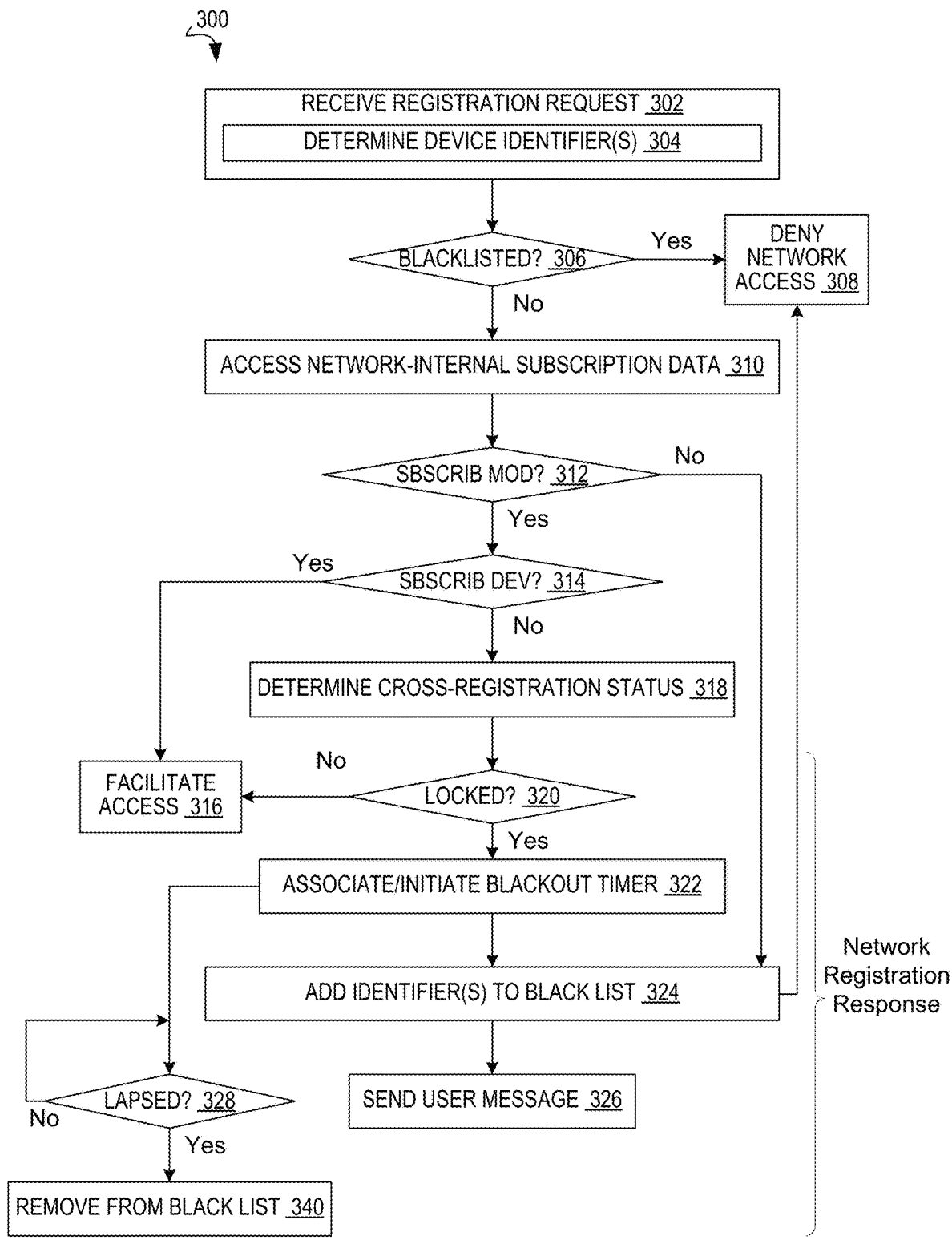
FIG. 3 is a flow diagram illustrating an example method for reporting location information in accordance with one or more implementations of the present technology.

FIG. 3 is a flow diagram illustrating an example method 300 for authenticating the mobile device 102 in accordance with one or more implementations of the present technology. The method 300 can be for operating the first network 100 to authenticate subscription status of devices requesting registration to a network within an integrated or a multi-network environment. The method 300 may be implemented using one or more network nodes of the first network 100 and/or the second network 108.

At block 302, the first network 100 can receive a registration request (e.g., the registration request 222). The registration request may be a SIP message from the mobile device 102 (e.g., the UE). The first network 100 can receive the registration request 222 from the UE 102 at the core access node 122, such as the P-CSCF and/or the I-CSCF. The registration request 222 may be for establishing a base-level connection, such as for facilitating voice communication functions of the mobile device 102.

At block 304, the first network 100 can identify one or more device identifiers based on the registration request. For example, the first network 100 can use a network node (e.g., the core access node 122) to identify the device-based identifier 112 and/or the module-based identifier 116 based on the registration request 222. The first network 100 can identify the one or more device identifiers according to a predetermined sequence and/or a predetermined format associated with the registration request 222.

At decision block 306, the first network 100 can determine whether the one or more device identifiers are included in the network blacklist 228. For example, the first network 100 can use one or more network nodes (e.g., the core access node 122 and/or the HSS) to compare the device-based identifier 112 and/or the module-based identifier 116 to the network blacklist 228. When the device-based identifier 112 and/or the module-based identifier 116 matches an entry in the network blacklist 228 (i.e., the requesting device is blacklisted), the first network 100 can deny network access to the mobile device 102 as illustrated at block 308. In other words, the first network 100 can prevent the mobile device 102 from accessing the core network 106 within the first network 100 in response to the received request.

When the device-based identifier 112 and/or the module-based identifier 116 are not found within the network blacklist 228 (i.e., the requesting device is not blacklisted), the first network 100 can access network-internal subscription data as illustrated at block 310. For example, the first network 100 can access the subscription profile 126 managed by the subscription database 124 (e.g., the HSS) associated with the first network 100. In some implementations, the first network 100 can access the subscription profile 126 based on communicating network-internal instances of the subscription status query 224 and the subscription status response 226. For example, the core access node 122 and the internal subscription database 124 can exchange information to determine whether the requesting mobile device 102 corresponds to a subscriber for the first network 100. The first network 100 can determine the subscriptions status of the requesting mobile device 102 based on comparing (1) the module-based identifier 116 to the module subscription data 130 and/or (2) the device-based identifier 112 to the device subscription data 128.

In some implementations, the first network 100 (e.g., the GSM network) can require verification of both the module-based identifier 116 and the device-based identifier 112 for allowing the requesting device to access the core network 106. At decision block 312, the first network 100 can determine whether the access module 114 corresponds to a subscriber of the first network 100. The first network 100 can compare the module-based identifier 116 to the module subscription data 130. When the module-based identifier 116 is absent in the module subscription data 130, the first network 100 can determine that the access module 114 of the requesting mobile device 102 is not a subscriber module. Accordingly, the first network 100 can execute a corresponding network registration response, such as by adding the module-based identifier 116 to a blacklist (e.g., the network blacklist 228) (block 324) and/or denying network access to the requesting mobile device (block 308). Details regarding the blacklisting are described below.

When the module-based identifier 116 is included in the module subscription data 130, the first network 100 can determine that the access module 114 of the requesting mobile device 102 is a subscriber module. Accordingly, the first network 100 can determine whether the mobile device 102 corresponds to a subscriber of the first network 100 as illustrated at decision block 314. The first network 100 can compare the device-based identifier 112 to the device subscription data 128 for the first network 100. When the device-based identifier 112 is included in the device subscription data 128, the first network 100 can conclude that the requesting mobile device 102 corresponds to an authorized subscriber of the first network 100. Accordingly, at block 316, the first network 100 can facilitate network access for the mobile device 102. In other words, the first network 100 can allow the mobile device 102 to access the core network 106.

When the device-based identifier 112 is absent in the device subscription data 128, the first network 100 can determine that the registration request may be from the mobile device 102 initially configured to operate on the second network 108 (e.g., a network implementing a different channel access mechanism). Accordingly, at block 318, the first network 100 can determine a cross-registration status by communicating with the second network 108. The first network 100 can send a cross-registration query (e.g., an instance of the subscription status query 224 sent across different networks) to the second network 108 to identify unlocked devices authorized to connect to a network (e.g., the first network 100) outside of an initially-contracted network (e.g., the second network 108). The cross-registration query can include the module-based identifier 116 and/or the device-based identifier 112.

The second network 108 can process the cross-registration query using a cross-registration database (e.g., an instance of the subscription database 124 for the second network 108). The second network 108 can compare the module-based identifier 116 and/or compare the device-based identifier 112 to subscriber data. The second network 108 can send a cross-registration status (e.g., an instance of the subscription status response 226 communicated across different networks) that represents the comparison results to the first network 100.

As an illustrative example, the CDMA network can receive the cross-registration query when the GSM network is unable to authenticate the SIM of the requesting device. The CDMA network can compare the device-based identifier 112 to the network subscriber list (e.g., the device subscription data 128 of the CDMA network). When the device-based identifier 112 corresponds to a subscriber, the CDMA network can determine the unlocked status 134, such as by accessing a predetermined data storage location and/or by analyzing authorization data like fulfillment status of the contractual terms 132 (e.g., subscribed duration, subscription status, payment status, or other authorized unlock status). The CDMA network can send the cross-registration status that indicates whether the mobile device 102 is limited to accessing only the second network (e.g., a locked status) or is given permission to register outside of the second network 108 (e.g., an unlocked status). The second network 108 can be configured to return the unlocked status when the mobile device 102 is not included in the subscriber data for the second network 108. Accordingly, the first network 100 can identify the mobile device 102 as a new device being used by a subscriber. In some implementations, the first network 100 and/or the second network 108 can include components that validate an authentication eligibility. Accordingly, the components can be configured to intercept authentication requests from the mobile device 102, such as when the mobile device 102 not recognized by the corresponding network. While the mobile device 102 may be able to register on the network, the IMEI can be validated to determine movement eligibility and registration permitted or disallowed based on the criteria.

The first network 100 can execute a network registration response according to the cross-registration status of the mobile device 102. The first network 100 can execute the network registration response to control access of the network by the mobile device 102. At decision block 320, the first network 100 can receive the cross-registration status from the second network 108 and determine whether the requesting mobile device 102 is locked. When the cross-registration status indicates that the requesting mobile device 102 not locked, the first network 100 can facilitate network access for the mobile device 102 (block 316). For example, the first network 100 can enable a CDMA-configured device to operate in a GSM environment when the cross-registration status indicates the mobile device 102 as an unlocked device.

Otherwise, when the cross-registration status indicates that the requesting mobile device 102 is locked, the first network 100 can identify the requesting mobile device 102 as the locked device 202. The first network 100 can further determine from the locked status an absence of permission for the locked device 202 to register outside of the second network 108.

Accordingly, the first network 100 can temporarily blacklist the locked device 202. To implement the temporary status, the first network 100 can associate the locked device 202 to the blackout timer 230 (via, e.g., setting a pointer from the blacklist entry of the device-based identifier to a counter) as illustrated at block 322. Also as illustrated at block 322, the first network 100 can initiate the blackout timer 230.

At block 324, the first network 100 can add one or more identifiers of the requesting mobile device 102 to the network blacklist 228. For example, the first network 100 can add the device-based identifier 112 and/or the module-based identifier 116 to the network blacklist 228. Along with blacklisting the device, the first network 100 can deny network access for the non-verified device (block 308). Subsequent registration request from the blacklisted device can be handled as described above for blocks 306 and 308.

When the requesting device is determined as the locked device 202, the first network 100 can temporarily add the corresponding device-based identifier 112 and/or module-based identifier 116 to the network blacklist 228 for preventing the UE from accessing the network for a limited predetermined duration following reception of the registration request 222. In some implementations, the first network 100 can also send a user message (e.g., the registration error message 232) as illustrated at block 326. Accordingly, the first network 100 can enable the user to remedy any inadvertent errors or contractual conditions for reregistering the mobile device 102 (i.e., without permanently blacklisting the device).

For temporarily blacklisting a device, the blackout timer 230 can start counting up to or down from a predetermined duration for blacklisting the locked device 202. At block 328, the first network 100 can determine (via, e.g., an interrupt routine) whether the predetermined duration has lapsed. The first network 100 can continue to monitor the blackout timer 230 until the predetermined duration lapses. If the locked device 202 attempts to re-register during the predetermined duration, the first network 100 can deny network access as described above for blocks 306 and 308. After the predetermined duration, the first network 100 can remove the locked device 202 from the network blacklist 228. Accordingly, the first network 100 can allow the user to remedy any issues and re-register instead of permanently blacklisting the device. Thus, the first network 100 can allow the mobile device 102 to register and access the core network 106 in response to receiving a second/subsequent registration request after the predetermined duration according to the method 300, so long as the request follows an update to the unlocked status 134 of the mobile device 102.

Computer

Figure 4:
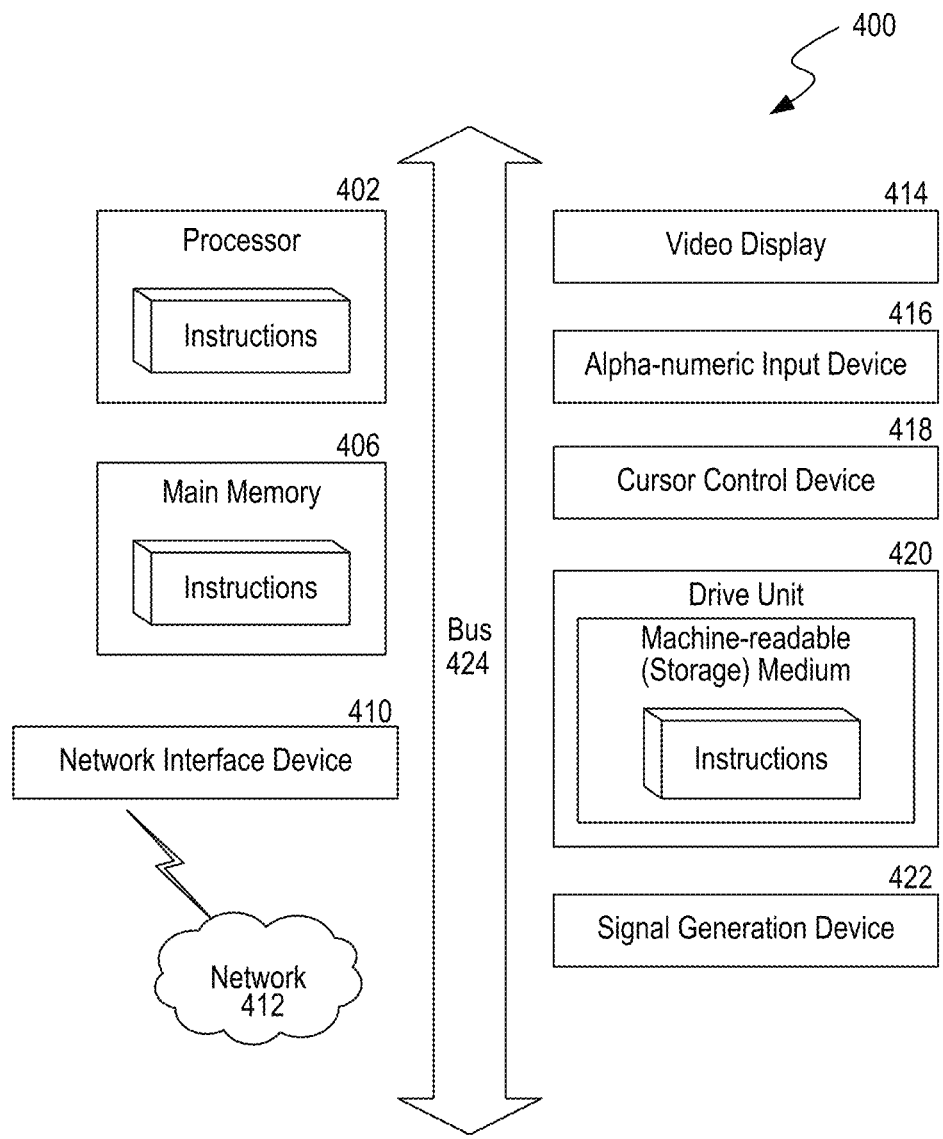
FIG. 4 is a diagrammatic representation of a machine in the example form of a computer system within which a set of instructions, for causing the machine to perform any one or more of the methodologies discussed herein, can be executed.

FIG. 4 is a diagrammatic representation of a machine in the example form of a computer system 400 within which a set of instructions, for causing the machine to perform any one or more of the methodologies or modules discussed herein, can be executed.

In the example of FIG. 4, the computer system 400 includes a processor 402, a memory 406, a drive unit 420 (e.g., a machine-readable storage medium, such as a non-volatile memory), and an interface device 410. Various common components (e.g., cache memory) are omitted for illustrative simplicity. The computer system 400 is intended to illustrate a hardware device on which any of the components described in the example of FIGS. 1-4 (and any other components described in this specification) can be implemented. The computer system 400 can be of any applicable known or convenient type. The components of the computer system 400 can be coupled together via a bus or through some other known or convenient device.

This disclosure contemplates the computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 can include one or more computer systems 400; be unitary or distributed; span multiple locations; span multiple machines; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real-time or in batch mode one or more steps of one or more methods described or illustrated herein. One or more computer systems 400 can perform at different times or at different locations one or more steps of one or more methods described or illustrated herein, where appropriate.

The processor 402 can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor 402.

The memory 406 is coupled to the processor by, for example, a bus 424. The memory 406 can include, by way of example but not limitation, random access memory (RAM), such as dynamic RAM (DRAM) and static RAM (SRAM). The memory 406 can be local, remote, or distributed.

The bus 424 also couples the processor 402 to the drive unit 420. The drive unit 420 can include a non-volatile memory that is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the drive unit 420. It should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 424 also couples the processor 402 to the network interface device 410. The network interface device 410 can include one or more of a modem or network interface. It will be appreciated that a modem or network interface can be considered to be part of the computer system 400. The network interface device 410 can include an analog modem, ISDN modem, cable modem, token ring interface, satellite transmission interface (e.g., "direct PC"), or other interfaces for coupling a computer system to other computer systems.

The system 400 can include one or more input and/or output devices, such as a video display 414 and/or an alpha-numeric input device 416. The I/O devices can include, by way of example but not limitation, a keyboard, a mouse or other pointing device, disk drives, printers, a scanner, and other input and/or output devices, including a display device. The video display 414 can include, by way of example but not limitation, a cathode ray tube (CRT), liquid crystal display (LCD), or some other applicable known or convenient display device. For simplicity, it is assumed that controllers of any devices not depicted in the example of FIG. 4 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some implementations. The required structure for a variety of these systems will appear from the description below. In addition, the techniques are not described with reference to any particular programming language, and various implementations can thus be implemented using a variety of programming languages.

In alternative implementations, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary implementation to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while implementations have been described in the context of fully functioning computers and computer systems, those skilled in the art will appreciate that the various implementations are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disc Read-Only Memory (CD ROMS), Digital Versatile Discs, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. An apparatus for communicating with networks of first and second types, the apparatus comprising:
    one or more processors; and
    at least one memory coupled to the one or more processors, wherein the memory stores an identifier and includes instructions executable by the one or more processors to:
        provide a registration request to the network of the first type, wherein the provided registration request includes the identifier;
        wherein, in response to receipt of the registration request, the network of the first type:
            receives an authorization status for the apparatus on the network of the second type,
                wherein the authorization status includes a locked status representing permission for the apparatus to register outside of the network of the second type; and
            in response to an absence of permission from the locked status, adds the identifier for the apparatus to a set of identifiers for preventing the apparatus from accessing another network outside of the network of the second type.

2. The apparatus of claim 1:
    wherein the at least one memory includes a transportable access module for storing the identifier and a nonvolatile memory for storing the instructions;
    wherein the received registration request is a first received request;
    wherein the apparatus provides a second registration request and a status update for the apparatus, and wherein the identifier is compatible with the network of the first type; and
    wherein the network of the second type registers the apparatus to access the network of the first type based on the second registration request after denying the first registration request.

3. The apparatus of claim 1, wherein:
    the identifier includes (1) a non-transferable identifier that directly represents the apparatus specifically for the network of the second type and (2) a device-transferrable identifier for the network of the first type; and
    identification that the registration request is from the apparatus initially configured to operate on the network of the second type when (1) the non-transferable identifier is absent from subscriber information of the network of the first type and (2) the device-transferrable identifier is found within the subscriber information.

4. The apparatus of claim 1, wherein:
    the network of the first type is a Global System for Mobile Communications (GSM) network; and
    the registration request represents a request from the apparatus initially configured to operate on a Code-Division Multiple Access (CDMA) type network.

5. The apparatus of claim 1, wherein the memory includes further instructions executable by the one or more processors to:
    receive a message based on the identifier, wherein the message is for communicating to a user of apparatus regarding temporary denial of access to the network of the first type.

6. The apparatus of claim 1, wherein the network of the second type comprises a cross-registration database is for identifying unlocked devices authorized to connect to networks outside of an initially-contracted network for the apparatus.

7. The apparatus of claim 1, wherein the instructions further comprise executing network registration so as to register the apparatus to access the network of the first type when the authorization status indicates the apparatus as an unlocked device.

8. The apparatus of claim 1, wherein the network of the first type:
identifies that the apparatus is initially configured to operate on the network of the second type, wherein the network of the second type is communicatively coupled to, but operationally differs from, the network of first type; and
sends a cross-registration query including the identifier for the apparatus to the network of the second type.

9. At least one non-transitory, computer-readable medium, carrying instructions, which when executed by an apparatus for communicating with networks of first and second types, performs operations, the operations comprising:
provide a registration request to the network of the first type,
wherein the registration provided request includes an identifier for the apparatus;
wherein, in response to receipt of the registration request, the network of the first type:
receives an authorization status for the apparatus on the network of the second type,
wherein the authorization status includes a locked status representing permission for the apparatus to register outside of the network of the second type; and
in response to an absence of permission from the locked status, adds the identifier for the apparatus to a set of identifiers for preventing the apparatus from accessing at least the network of the first type.

10. The at least one non-transitory, computer-readable medium of claim 9:
wherein the received registration request is a first received request;
wherein the apparatus provides a second registration request and a status update for the apparatus, and wherein the identifier is compatible with the network of the first type; and
wherein the network of the first type registers the apparatus to access the network of the first type based on the second registration request after denying the first registration request.

11. The at least one non-transitory, computer-readable medium of claim 9, wherein:
the identifier includes (1) a non-transferable identifier that directly represents the apparatus specifically for the network of the second type and (2) a device-transferrable identifier for the network of the first type; and
identification that the registration request is from the apparatus initially configured to operate on the network of the second type when (1) the non-transferable identifier is absent from subscriber information of the network of the first type, and (2) the device-transferrable identifier is found within the subscriber information.

12. The at least one non-transitory, computer-readable medium of claim 9, wherein:

the network of the first type is a Global System for Mobile Communications (GSM) network; and
the registration request represents a request from the apparatus initially configured to operate on a Code-Division Multiple Access (CDMA) type network.

13. The at least one non-transitory, computer-readable medium of claim 9, wherein the instructions further include:
receiving a message based on the identifier, wherein the message is for communicating to a user of the apparatus regarding temporary denial of access to the network of the first type.

14. The at least one non-transitory, computer-readable medium of claim 9, wherein the network of the second type comprises a database is for identifying unlocked devices authorized to connect to networks outside of an initially-contracted network for the apparatus.

15. The at least one non-transitory, computer-readable medium of claim 9, wherein the instructions further comprise executing network registration so as to register the apparatus to access the network of the first type when the authorization status indicates the apparatus as an unlocked device.

16. The at least one non-transitory, computer-readable medium of claim 9, wherein the network of the first type:
identifies that the apparatus is initially configured to operate on the network of the second type, wherein the network of the second type is communicatively coupled to, but operationally differs from, the network of first type; and
sends a cross-registration query including the identifier for the apparatus to the network of the second type.

17. A method for use in a wireless telecommunications network, the method comprising:
managing registration of user equipment devices, configured on a first type of network, for a second, different type of network;
querying the first type of network for authorization status of the user equipment devices configured on the first type of network;
for each user equipment device configured on the first type of network, either:
a) registering the user equipment device configured on the first type of network, and providing network access to the user equipment device configured on the first type of network, when the authorization status indicates eligibility, or
b) temporarily adding the user equipment device configured on the first type of network to a set of user equipment devices prevented from registering on the second type of network,
wherein when a temporary status expires, the user equipment device configured on the first type of network is permitted to re-register.

18. The method of claim 17, wherein:
the first type of network is a CDMA network, and the second type of network is a GSM network.

19. The method of claim 17, wherein:
wherein the authorization status represents that a particular user equipment device has met requirements for unlocking the particular user equipment device.

20. The method of claim 17, wherein:
wherein the temporary status expires after a predetermined duration to enable the user equipment device configured on the first type of network to re-register at using a proper SIM.

* * * * *